United States Patent [19]

Minsky

[11] 4,005,798
[45] Feb. 1, 1977

[54] LID MOUNT
[75] Inventor: Norman C. Minsky, West Bend, Wis.
[73] Assignee: Dart Industries Inc., Los Angeles, Calif.
[22] Filed: Sept. 19, 1975
[21] Appl. No.: 615,014
[52] U.S. Cl. .......................................... 220/85 CH
[51] Int. Cl.² ........................................ B65D 25/00
[58] Field of Search ............ 220/85 CH, ; 248/360; 16/110 A, 114 A

[56] References Cited
UNITED STATES PATENTS

| 498,020 | 5/1893 | Murray | 220/85 CH |
|---|---|---|---|
| 2,259,770 | 10/1941 | Nove | 220/85 CH |
| 2,808,175 | 10/1957 | Aiken | 220/85 CH |
| 2,963,761 | 12/1960 | Haydock | 248/360 |
| 3,081,394 | 3/1963 | Arel et al. | 220/85 CH |

FOREIGN PATENTS OR APPLICATIONS 59,695  6/1954  France ............... 220/85 CH Primary Examiner—William Price
Assistant Examiner—Allan N. Shoap
Attorney, Agent, or Firm—Kenneth J. Hovet

[57] ABSTRACT

A support block is affixed to the sidewall of a cooking utensil cover. The block is provided with a slot across its outer face adapted to engage the top rim of the utensil. The slot is oriented in the block to cause the cover to assume an approximate upright position over the utensil when the slot is engaged with the utensil rim.

4 Claims, 8 Drawing Figures

LID MOUNT

BACKGROUND OF THE INVENTION

1. Field of the Invention

The present invention relates to an improvement in cookware and, more particularly, to a cooking utensil cover havng a means for mounting the cover in an approximate upright position on the utensil rim.

2. Description of the Prior Art

During the preparation of foodstuffs in a skillet, saucepan, ducth oven or the like, it is frequently necessary to remove the cooking utensil cover and stir or baste the items being cooked therein. Quite often the cover interior is spattered with liquid exuded from the foodstuff during the cooking process or the interior surfaces are covered with condensate. As such, it is undesirable to place the cover on a counter top and allow the fluids to accumulate thereon. Likewise, such placement is undesirable because the cover is generally quite hot and could cause a burn by an unwary user.

Still further the stirring or basting of foodstuffs in a cooking utensil may require the use of both hands. In such a case, the cover will have to be placed upon a counter top or the like with the aforementioned inherent disadvantages.

SUMMARY OF THE INVENTION

The present invention provides a support means secured to a sidewall of a cooking utensil cover which allows the cover to be engaged in a somewhat upright position upon the top rim or edge of the utensil. This frees both of the user's hands for use in stirring or basting the foodstuffs cooking in the utensil. If further eliminates potential hazards incumbent with placing the hot cover on a counter top or the like. Additionally, by locating the cover in a somewhat upright position on the edge of the cooking utensil, the savory fluids exuded during the cooking process will flow from the interior surfaces of the cover back into the cooking utensil. This, of course, enhances the flavor and nutritional value of the foodstuff and also prevents it from becoming overly dry.

The lid mount of the present invention includes fastener means for affixing the mount to the utensil cover and includes a slot extending across the outer surface thereof. The slot may take the shape of the sidewall edge contour and is of a width slightly larger than the thickness thereof. It is desirable that the slot extend laterally at an acute angle with respect to the sidewall surface of the cover. In this way when the mount is engaged with the utensil rim the cover will assume a titlted position over the utensil. In this manner the condensate and cooking fluids will more readily drain back into the cooking utensil and there will be less tendency for the cover to become unbalanced or dislodged.

DESCRIPTION OF THE PREFERRED EMBODIMENT

Figure 1:
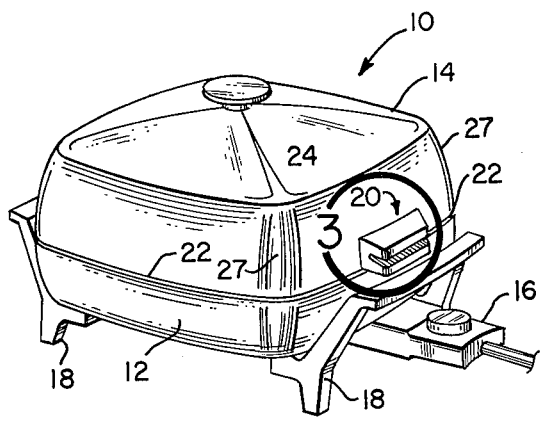
FIG. 1 is a perspective view of a cooking utensil and cover having the lid mount of the present invention.
Figure 2:
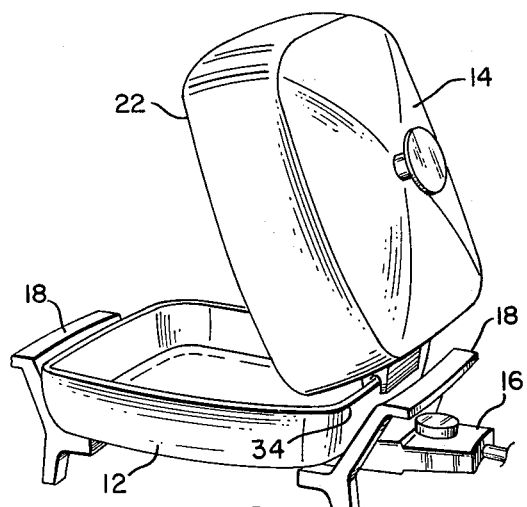
FIG. 2 is the cover and utensil of FIG. 1 with the cover engaged with the rim of the utensil by connection with the lid mount.

Referring now to the drawings, a cooking utensil 10 is shown comprising a pan 12 and cover 14. The particular illustrative embodiment shown in FIGS. 1 and 2 is an electric skillet having a thermostat means 16 and leg handles 18. Of course, these features form no part of the invention, but are included to show a suitable combination in which the mounting means 20 may be utilized.

The mounting means 20 is secured to the cooking utensil cover 14 adjacent the peripheral edge 22. In the embodiment shown, the mounting means is secured to sidewalls 24 of the cover proximate the midpoint between the lateral ends or corners 27. In this manner the cover will attain a stable posture when mounted in the position shown in FIG. 2.

Figure 3:
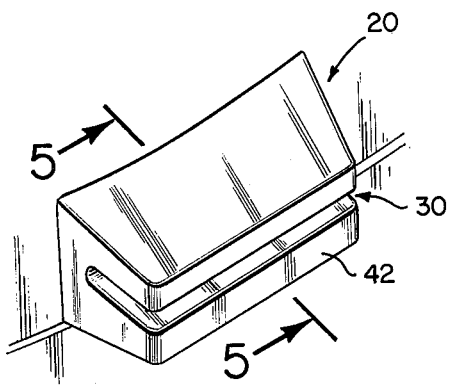
FIG. 3 is an enlarged view taken along line 3 of FIG. 1.
Figure 4:
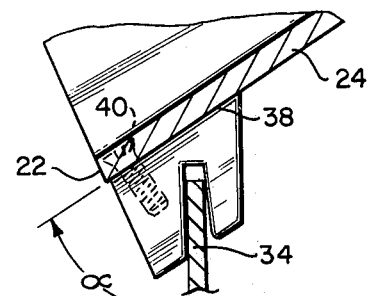
FIG. 4 is a fragmentary enlarged cross-section view of the lid mount engaged with the utensil rim shown in FIG. 2.
Figure 5:
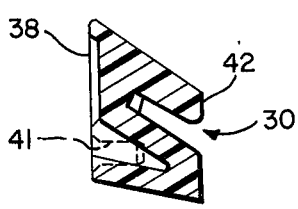
FIG. 5 is a cross section taken along lines 5–5 of FIG. 3.
Figure 6:
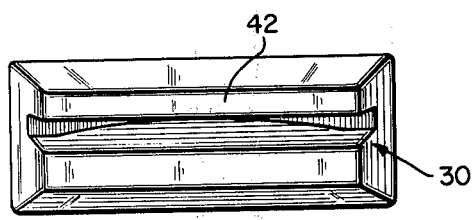
FIG. 6 is a front elevation view of the lid mount shown in FIG. 1.
Figure 7:
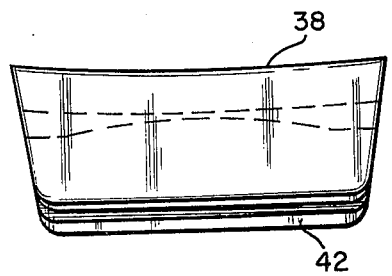
FIG. 7 is a top plan view of the mount shown in FIG. 1.
Figure 8:
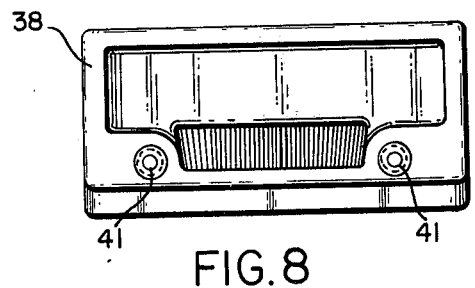
FIG. 8 is a back elevation view of the lid mount of FIG. 1.

As best shown in FIGS. 3–5, the mounting means 20 includes an opening 30 adapted to engage a portion of the rim 34 of the pan 12. The opening 30 is disposed in the mounting means in a manner to orient the cover 14 in an inclined position above the pan 12 when the opening is in engagement with the pan rim 34.

In the particular embodiment shown, the mounting means is a block of molded insulative material and includes a first surface 38 which contacts the cover sidewall 24 in a flush manner. With such a large area of contact a more stable connection is obtained thereby resulting in a strong stable connection. The mounting means is secured against the sidewalls with a pair of screws shown by reference numeral 40 engaging corresponding threaded openings 41. Of course, other fastening means may be used such as adhesion, spot welding, bolts, or the like. It is also contemplated that the mounting means may be formed integral with the utensil cover and/or sidewall.

The block 20 includes a second surface 42 which is the outermost surface of the block generally opposite the first surface. This second surface 42 contains the opening 30, which, in this embodiment, is a slot extending across the second surface. The lateral extent of the slot is inclined at an acute angle α relative to the surface of the sidewall. In this manner when the cover and mounting means are positioned upon the edge of the rim 34, the cover will be disposed in an inclined somewhat upright position over the pan. This, of course, allows for any condensates or cooking fluids accumulated on the interior surfaces of the cover to drain down and flow into the pan itself. Additionally, the cover is less likely to wobble into a more vertical position whereby it would be unstable and cause a possible imbalance of the pan 12.

It will be understood that the present invention includes a mounting means on utensil covers that are without sidewalls. Such covers are typically used with saucepans or dutch ovens and may be slightly convex in cross-sectional shape with a flat peripheral rim. With such covers the opening 30 would be disposed in the mounting block to orient the cover in an upright position when engaged with the utensil rim. In many instances the opening may extend almost parallel to the cover rim to effect the desired inclination between the cover and pan.

To further enhance the firm connection between the opening 30 and skillet rim 34 it will be understood that the opening preferably conforms to the shape of the rim. In the particular embodiment shown, the pan 12 is an electric skillet wherein the rim 34 is substantially straight. The slot 30 likewise is substantially straight. Of course, it will also be noted that the width of the slot is slightly larger than the width of the rim 34. It will be further understood that the slot opening 30 may take other configurations depending on the type of rim structure of the cooking utensil itself.

While the invention has been described with respect to a preferred embodiment, it will be apparent to those skilled in the art that various other modifications and improvements may be made without departing from the scope and spirit of the invention. Accordingly, it is to be understood that the invention is not to be limited by the specific illustrative embodiments, but only by the scope of the appended claims.

I claim:
1. A cooking utensil comprising a pan and cover therefor, wherein the improvement comprises:
   an elongated block having a first surface in contact with said cover along a peripheral edge thereof, said block having a second surface comprising the opposite side of the block relative to said just surface, said second surface containing an open-ended slot extending across the longitudinal extent thereof for engaging a portion of the rim of said pan, the lateral extent of said slot disposed in said block at an acute angle with respect to said first surface to orient said cover in an inclined position above said pan when said block is in engagement with the rim of said pan.
2. The utensil of claim 1 wherein said cover includes peripheral sidewalls integral with a top and said block is located proximate the midpoint between the lateral ends of one of said sidewalls.
3. The utensil of claim 1 wherein said first surface corresponds in shape to said area of contact with said cover and includes means for fastening said block to said cover.
4. The utensil of claim 1 wherein said slot is shaped to correspond to the shape of the rim of said pan.

* * * * *